(12) United States Patent
Andoh et al.

(10) Patent No.: US 6,730,222 B1
(45) Date of Patent: May 4, 2004

(54) HYDRODYNAMIC VORTEX SEPARATOR

(75) Inventors: Robert Yaw Gyamfi Andoh, Mitcham (GB); Mike Faram, Bristol (GB); Paul Le-Cornu, Shepton Mallet (GB)

(73) Assignee: Hydro International PLC (GB)

( * ) Notice: Subject to any disclaimer, the term of this patent is extended or adjusted under 35 U.S.C. 154(b) by 0 days.

(21) Appl. No.: 09/958,808

(22) PCT Filed: Apr. 17, 2000

(86) PCT No.: PCT/GB00/01482

§ 371 (c)(1),
(2), (4) Date: Oct. 15, 2001

(87) PCT Pub. No.: WO00/62888

PCT Pub. Date: Oct. 26, 2000

(30) Foreign Application Priority Data

Apr. 15, 1999 (GB) ............................................. 9908634

(51) Int. Cl.⁷ ......................... B01D 21/00; B01D 21/26; C02F 1/40
(52) U.S. Cl. .................... 210/304; 210/295; 210/512.1; 210/513; 210/532.1; 210/538
(58) Field of Search ................................ 210/295, 304, 210/512.1, 513, 532.1, 538

(56) References Cited

U.S. PATENT DOCUMENTS

| 3,136,724 A | 6/1964 | Sind et al. |
| 3,891,557 A | 6/1975 | Edgerton |
| 4,451,366 A | 5/1984 | Smisson |
| 4,619,771 A | 10/1986 | Stall et al. |
| 5,698,099 A | * 12/1997 | Fagan et al. ................. 210/304 |

FOREIGN PATENT DOCUMENTS

| EP | 0 495 386 | 7/1992 | |
| EP | 495386 A1 | * 7/1992 | ......... B01D/17/025 |
| EP | 0 577 948 | 1/1994 | |
| EP | 577948 A2 | * 1/1994 | ............. C02F/1/40 |
| EP | 865812 A1 | * 9/1998 | ........... B01D/21/00 |
| EP | 0 865 812 | 9/1998 | |
| GB | 1 515 485 | 6/1978 | |
| GB | 2 152 401 | 8/1985 | |
| GB | 2 193 955 | 2/1988 | |

* cited by examiner

Primary Examiner—David A. Reifsnyder
(74) Attorney, Agent, or Firm—Stites & Harbison PLLC; Marvin Petry (57) ABSTRACT

A hydrodynamic separator to separate floatable material from a liquid includes a separating vessel having a cylindrical outer wall; an inlet means for introducing the liquid into the vessel in a manner to promote a low energy rotational flow of liquid in the vessel; a base at one end; a top wall at the end opposite the base, the top wall including an axial outlet opening for receiving a flow containing floatable material separated from the liquid flow to the vessel; a flow modifying member provided within the vessel to define with the top wall an annular opening which is spaced from the outer wall; an annular dip plate spaced from the outer wall of the vessel, the dip plate comprising an upper edge spaced from the top wall to define a gap for the flow of liquid containing floatable matter; and an outlet separate from the axial outlet opening in the top wall, comprising a conduit for removing a primary liquid flow from the vessel, which conduit communicates with the interior of the vessel at a substantially axial location between the base and the top wall.

20 Claims, 12 Drawing Sheets

Prior Art

HYDRODYNAMIC VORTEX SEPARATOR

This invention relates to a hydrodynamic vortex separator, and is particularly concerned with such a separator for use in separating floatable matter, such as grease, from a liquid flow which comprises the floatable matter. The invention also relates to a separator for separating from each other, and from the liquid stream in which they are present, a settleable material and a floatable material such as grit and grease present in a waste water stream. Also disclosed herein is a new inlet arrangement for a hydro-dynamic separator.

Hydrodynamic vortex separators are well known and are based on initial research work carried out in the 1950's and 1960's (*Design, Construction and performance of vortex overflows*, Bernard Smisson, Symposium on Storm Sewage Overflows, Institution of Civil Engineers, 1967, pages 99–110). They have found application as combined sewer overflows (CSOs) and as grit separators.

Separators known as "Hydro-Dynamic" separators are low energy devices which operate on the principle of allowing a liquid containing suspended solid material to rotate in a cylindrical vessel so that the solid material falls under gravity to the base and there is swept to a central lower outlet by an inward sweeping effect caused by complex flow patterns in the device. It is known that the device is suitable for providing enhanced settlement of solids material from a liquid/solid mixture. Thus, such devices have been used in sewage treatment for separating hard grit from the incoming raw sewage, with the resultant degritted sewage then being passed to a conventional sewage treatment plant. They are also used as "storm water overflows" upstream of conventional sewage treatment works to ensure that gross contamination is separated from liquid waste during storm conditions when the sewage treatment works is unable to cope with the high flow. "Hydro-Dynamic" separators of this type are described and claimed in, for instance, British Patent Specifications Nos. 2082941 (corresponding to U.S. Pat. No. 4,451,366) and 2,158,741 (corresponding to U.S. Pat. No. 4,747,962).

The known hydro-dynamic separator is a simple device with no moving parts. The simple geometry of the device however, hides an internal complexity of flow structure. The mean flow pattern observed is a downward helical flow in the outer region and an upward helical flow near the central region of the separator. These two spiral flow regimes are separated by a shear zone region. The combination of underflow and overflow leads to a non-uniform axial flow profile. The effects of fluid viscosity, boundary layers and momentum transfer between adjacent zones of flow moving at different velocities, cause velocity gradients and vorticity (rotation) to be present. These result in a secondary flow, superimposed on the primary flow, which in turn results in solids being swept towards the underflow channel (or solids collection trough/hopper). The hydraulic regime in the separator ensures very little short-circuiting with a near plug-flow type flow regime.

As discussed above, the principle of hydrodynamic separation has heretofore been used to facilitate the separation of settleable material (i.e. material which tends to settle under the action of gravity) from a liquid flow. It has now surprisingly been found that this same principle may be used for the separation of a floatable material from a liquid flow. Put simply, this is achieved by arranging the elements of the known hydrodynamic separator in the opposite orientation. Surprisingly, the flows generated in use act to concentrate floatable solid matter, which naturally rises in the vessel as a result of its buoyancy, at a central upper region where it can be directed away from the normal flow of liquid through the vessel, and collected for disposal.

Thus, according to a first aspect of the present invention, there is provided a hydrodynamic separator for the treatment of a liquid flow containing floatable material to separate the floatable material from the liquid containing it, said separator comprising a separating vessel having:

a cylindrical outer wall;

an inlet means for introducing said liquid into the vessel in a manner to promote a rotational flow of liquid in the vessel;

a base at one end;

an upper wall at the end opposite the base, the upper wall including an axial outlet opening for receiving a flow containing floatable material separated from the liquid flow to the vessel; and an outlet means, separate from the outlet opening in the upper wall, comprising a conduit for removing a primary liquid flow from the vessel, which conduit communicates with the interior of the vessel at a substantially axial location between the base and the upper wall.

The separator of the first aspect of this invention may further include an annular dip-plate spaced from the outer wall of the vessel. The dip plate helps in stabilising the flows in the vessel and in particular delimits an outer faster moving flow and an inner slower moving flow. The precise radial position of the dip plate may be chosen to give the optimum performance for a given design of separator, depending on the likely character of the liquid flow to the vessel. Normally, the annular dip plate will be located between about 0.2 and 0.8 of the distance between the axis of the vessel and the outer wall. The height of the dip plate is not critical. In some embodiments it will be relatively shallow in height relative to the height of the vessel; in other embodiments, however, it may be quite deep. Normally, the dip plate will be of a height which is at least the height of the inlet opening into the vessel and normally it will at least partially overlap the inlet opening in the vertical direction.

The separator of this aspect of the invention may also comprise a flow-modifying member provided within the vessel to define with the top wall an annular opening which is spaced from the outer wall. The axial outlet in the top wall referred to above opens inward of the said annular opening. The said flow modifying member body may be generally conical in form with its base uppermost, and aligned about the central axis of the vessel; the cone may be hollow or solid and may be provided with a central opening extending through the cone and aligned with its axis. In preferred embodiments, the cone is frusto-conical, that is to say with a truncation plane parallel to the base.

The upper wall preferably slopes upwardly towards the annular opening at its central region. The annular opening should preferably be positioned between about 0.2 and 0.8 times the radius of the vessel, more preferably between about 0.4 and 0.6 times the radius of the vessel from the central vertical axis.

The axial outlet opening in the upper wall may communicate with a chamber above the vessel, for collecting floatable matter. This chamber may include an outlet means whereby said floatable matter may be removed. Alternatively, the axial outlet opening may communicate directly with a suitable conduit whereby the floatable matter may be continuously directed away from the separator.

The base of the vessel preferably slopes downwards towards the central axis of the vessel. The base may include an axial outlet opening inward of the annular opening for receiving a flow containing settleable matter separated from the liquid flow to the vessel. This outlet opening may communicate with a chamber or sump which is itself provided with a outlet via which settled matter may be conveyed away from the vessel.

With a separating device having the features specified, when a liquid containing floatable matter is introduced in the vessel and caused to circulate about the vertical axis of the vessel, a complex flow pattern is established which gives rise to an efficient separation of floatable matter. The complex flow patterns established can be simplified and expressed as a circulating flow about the central vertical axis of the vessel, the circulating flow being divided between an outer, relatively fast flow and an inner relatively slow flow, the shear zone between these two regions preferably being stabilised by the upper edge of the annular dip-plate and the edge of the said flow-modifying member or body which defines the mouth of the annular opening.

The majority of the flow of liquid into the vessel flows out of the vessel via said outlet means. In addition to the majority of the liquid flow, any neutrally buoyant materials are also collected by and removed via the said outlet conduit. As stated above, the outlet means comprises a conduit which communicates with the interior of the vessel to receive liquid flow independent of the flow towards the axial opening in the top wall of the vessel. This conduit may communicate with a point in the vessel which is substantially located at or around the axis of the vessel so that liquid in the vessel following a toroidal path is captured by an open end of the conduit and carried away, for example substantially vertically, from the vessel to a point located outside the vessel.

The inlet means may comprise an inlet opening in the outer wall which communicates with an inlet conduit outside the vessel.

In one embodiment, the inlet conduit is tangentially oriented with respect to the outer wall in order to direct liquid into the vessel in a manner to promote a circulating flow in the vessel.

In another embodiment, the inlet means may comprise, within said vessel and communicating with said inlet opening, a duct arranged to direct incoming liquid flow in an arcuate path adjacent the inner surface of the outer wall of the vessel thereby to create said rotational flow.

In this embodiment, the said duct may comprise a vertical wall (preferably arcuate) inward of the outer wall of the vessel, extending part way round the vessel (this may be, for example, up to about a quarter of the circumference of the vessel) and a base wall forming a lower barrier to said duct. Thus, together, said arcuate wall, the outer wall of the vessel and the base wall form said duct, which may be open along its top side. The arcuate wall may be parallel or generally parallel to the outer wall of the vessel. Alternatively, said arcuate wall may intersect the outer wall at its inlet opening end and, as a result of having a smaller radius of curvature than the outer wall, follow a path which diverges from the outer wall. Further, the base wall may slope downwardly in a direction away from the inlet opening.

In one presently preferred arrangement of this embodiment, the inlet opening into the vessel is provided in the outer wall of the vessel above the upper wall, communicating with an inlet chamber which lies above the inlet duct and which communicates with the duct via a slot in the said top wall of the vessel. The liquid flow therefore sinks from this chamber through the slot and into the inlet duct and is there directed by the base-of the duct and the associated arcuate wall into the vessel with a-rotational component to its flow.

The inlet chamber may extend towards the outlet, beyond the point at which the inlet duct ends. A baffle may be provided to divide the inlet chamber at or around the point at which the inlet duct ends the baffle terminating above the floor of the inlet chamber so allowing liquid flow between two separate portions of the inlet chamber. The open part between the two portions may be provided with a screen to prevent floating matter from passing from the inlet side of the inlet chamber to the outlet side of the inlet chamber. The screen may comprise a series of spaced apart vertical bars. At the outlet side of the inlet chamber may be provided with an overflow weir which may be adjustable in height. The weir communicates with the outlet. This arrangement allows the overflow of liquid from the inlet to the outlet under high flow conditions beyond those at which the separator operates.

As an alternative to the arrangement described in the immediately preceding paragraph, the inlet chamber may be isolated from the outlet by a baffle having an opening which is normally closed by a closure, which closure is openable under relatively high flow conditions to allow the passage of liquid flow from the inlet chamber to the outlet. For example, the opening may be provided with a flap means which is normally biassed to close the opening. The biassing of the closure is selected, however, such that the flap opens under high flow conditions when a sufficient head of liquid has accumulated in the inlet chamber. As an alternative, the closure may be float operated, the float being position to float on the liquid level in the inlet chamber and being set to open the closure when the liquid level in the inlet chamber reaches a predetermined height. In this embodiment, the opening in the baffle may further be provided with a non-return means to prevent return flow of liquid from the outlet side of the baffle to the inlet chamber.

Figure 7A:
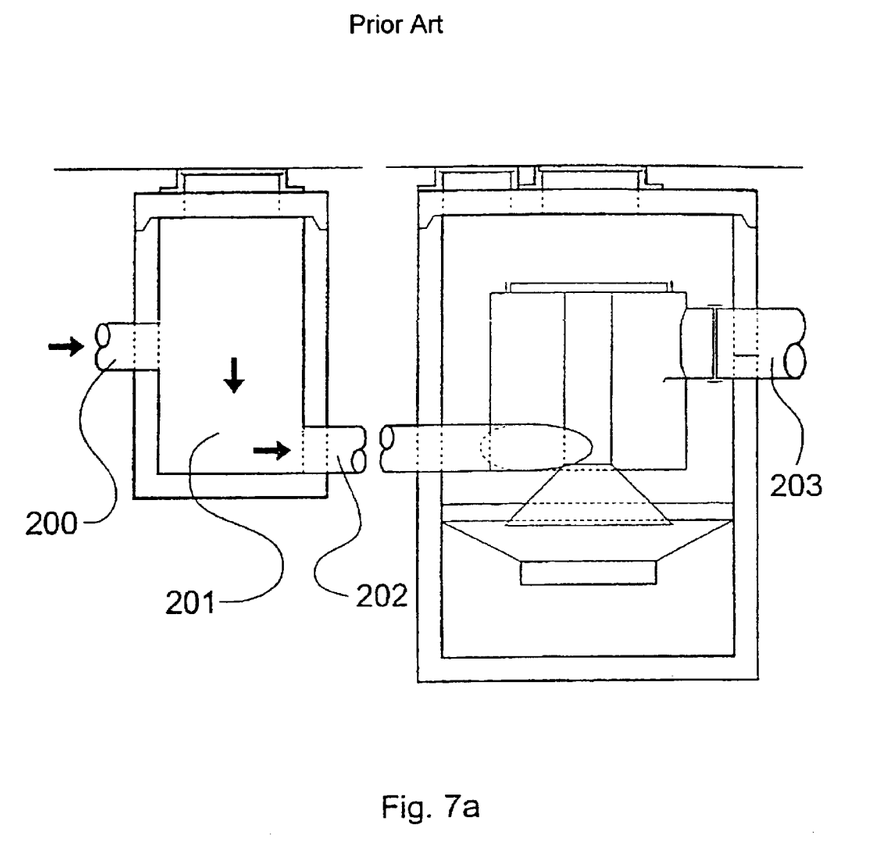
FIGS. 7a and 7b are elevation and plan views respectively of a prior art arrangement of inlet and outlet with an upstream chamber in a conventional hydrodynamic separator.
Figure 7B:
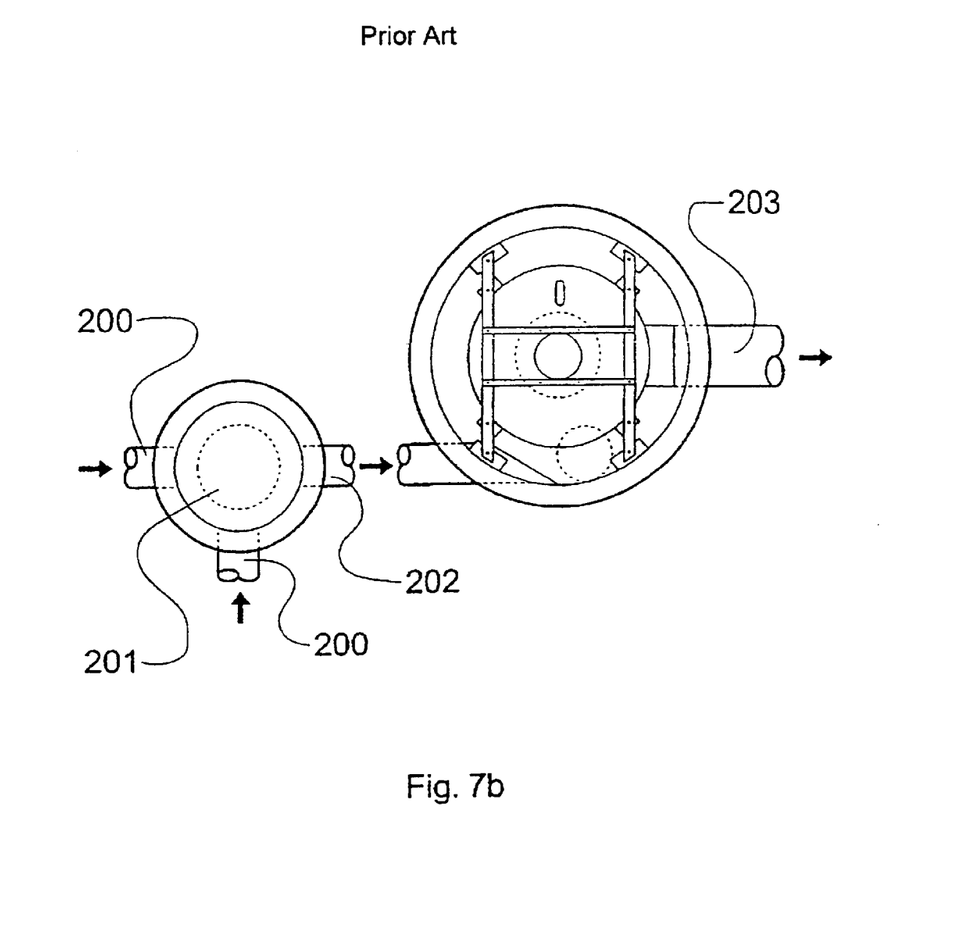

The preferred arrangement of inlet described above has a particular advantage over inlet arrangements to the known types of hydrodynamic separators, which is that the inlet opening to the vessel may be disposed at a height which is substantially the same height above the base of the vessel as the outlet from the vessel. In prior arrangements, the inlet opening has been located at a point in the middle of the side wall of the vessel, well below the level of the outlet, and this has necessitated a so-called inlet pit in the inlet line to the separator; under full flow conditions, the liquid in the inlet pit adopts a level which corresponds to the level of the outlet. A better appreciation of this advantage may be seen in FIG. 7a/b.

In this embodiment, the inlet conduit outside the vessel need not be tangential to the vessel, and indeed in a preferred embodiment it is not tangential. For example, the inlet conduit may intersect the outer wall of the vessel at a right angle or substantially at a right angle.

The separator in accordance with the present invention may additionally comprise the features of a conventional hydrodynamic separator, whereby it may perform the roles of separating floatable matter and solid, settleable matter, as well as neutrally buoyant material which are removed with the primary liquid flow out of the vessel. In such an embodiment, the separator of the present invention may additionally comprise a flow-modifying body within the vessel which defines with the base an annular opening which is spaced from the outer wall; the annular opening should preferably be positioned between about 0.2 and 0.8 times, preferably between 0.4 and 0.6 times, the radius of the vessel from the central vertical axis. The body may be in the form of a right, circular cone which is aligned about the central axis of the vessel with its base being lowermost; the cone may be hollow or solid and may be provided with a central opening extending through the cone and aligned with its axis. In preferred embodiments, the cone is frusto-conical, that is to say with a truncation plane parallel to the base. In addition for this embodiment, the annular dip-plate may be adjusted in height and radial position, if necessary, so as to assist in stabilising flow patterns which enhance settlement of settleable matter at the base of the vessel.

The inlet means described above in relation to the first aspect of the invention may also be used as an inlet means for a conventional hydro-dynamic separator as described herein.

Thus, according to a second aspect of the present invention, there is provided a hydrodynamic separator for the treatment of a liquid flow containing settleable matter from the liquid containing it, the separator comprising a vessel having:

a cylindrical outer wall;

an inlet means for introducing said liquid into the vessel in a manner to promote a rotational flow of liquid in the vessel, said inlet means comprising an inlet opening and, within said vessel in communication with said inlet opening, a duct arranged to direct liquid flow in an arcuate path adjacent the inner surface of the outer wall of the vessel thereby to create said rotational flow; and a base at one end, wherein the base includes an axial outlet opening for receiving a flow containing settleable matter separated from the primary liquid flow.

The separator may also include an annular dip-plate which is spaced from the outer wall of the vessel as described above and a flow-modifying member, analogous to that element as described above in relation to the first aspect of this invention, provided within the vessel to define with the base an annular opening which is spaced from the outer wall and which is outward of the annular opening in the base.

The separator of the first aspect of the present invention may be used in a method of separating floatable matter from a liquid flow containing said floatable matter (and in some embodiments also for separating from the liquid flow settleable matter and/or neutrally buoyant matter). In said method, the liquid flow is introduced into the vessel via the said inlet means and caused to flow in a rotational manner about the axis of the vessel. The flow patterns created cause floatable matter to be directed towards and through the outlet opening in the top wall, from where it can be removed. Settleable matter may be removed via the outlet opening in the base and neutrally buoyant material may be removed with the main liquid flow through the said outlet means.

In such methods of use, the hydraulic head needed to drive the flow through the device is less than 1000 mm and typically less than 500 mm This classifies the method as "low energy" by contrast with hydrocyclones which are high energy devices and typically operate at pressure heads of several bar (One bar is 10 m of water head).

Reference will now be made to the accompanying drawings, in which.

The separator shown in the accompanying FIGS. 1–6 performs a dual function of separating, from a liquid flow, both the floatable matter, such as grease, and the solid matter, such as grit. The separator therefore comprises the elements of a conventional hydro-dynamic separator whereby settleable solid matter may be removed from a liquid flow. In addition, the separator also includes new elements (as discussed below), to form a hydro-dynamic separator which exerts flow patterns which cause floatable matter to be concentrated at a central upper region of the vessel, from where it can be collected for disposal.

Figure 1:
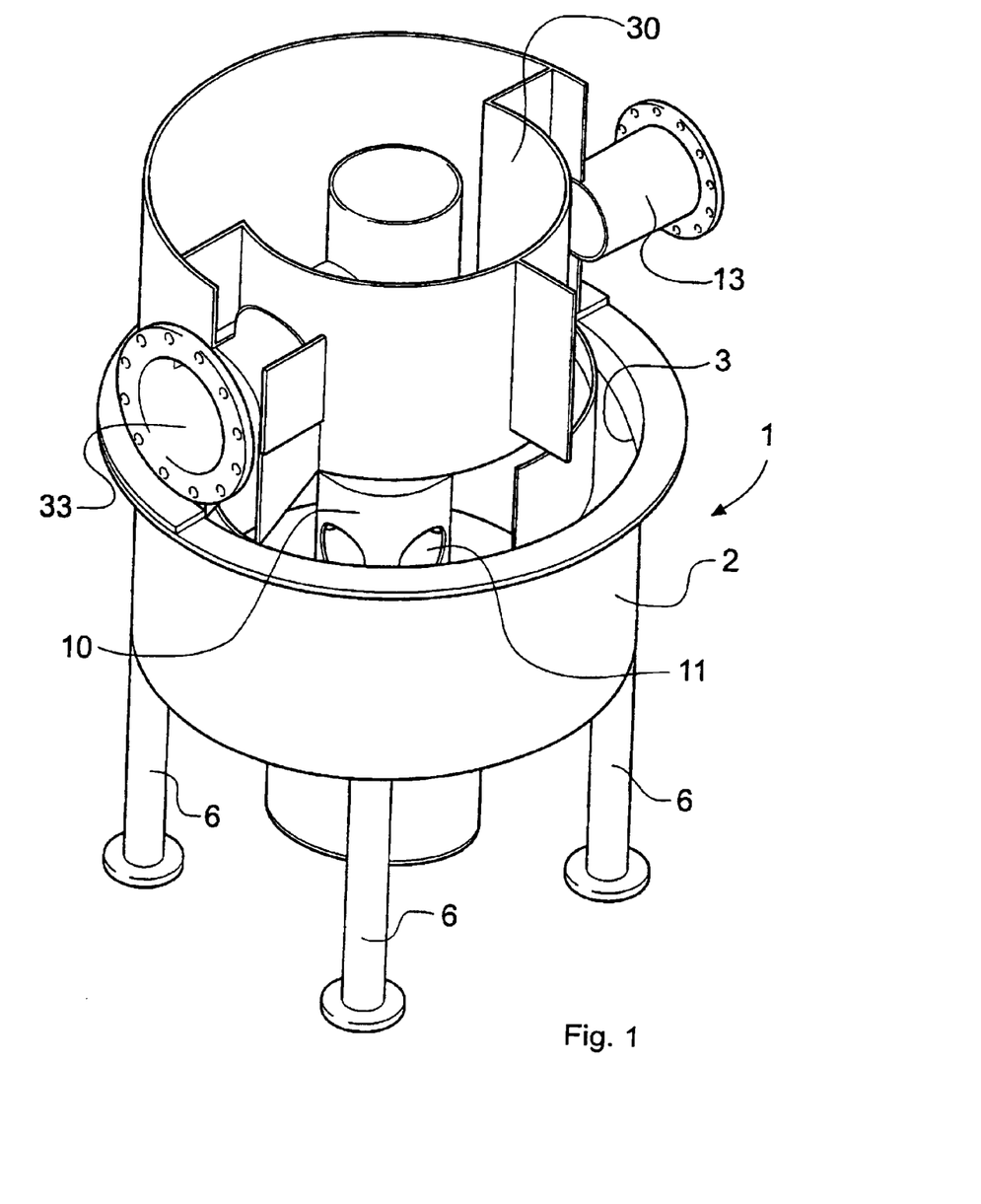
FIGS. 1, 2 and 3 are different cut-away perspective views of a separator in accordance with the present invention.
Figure 2:
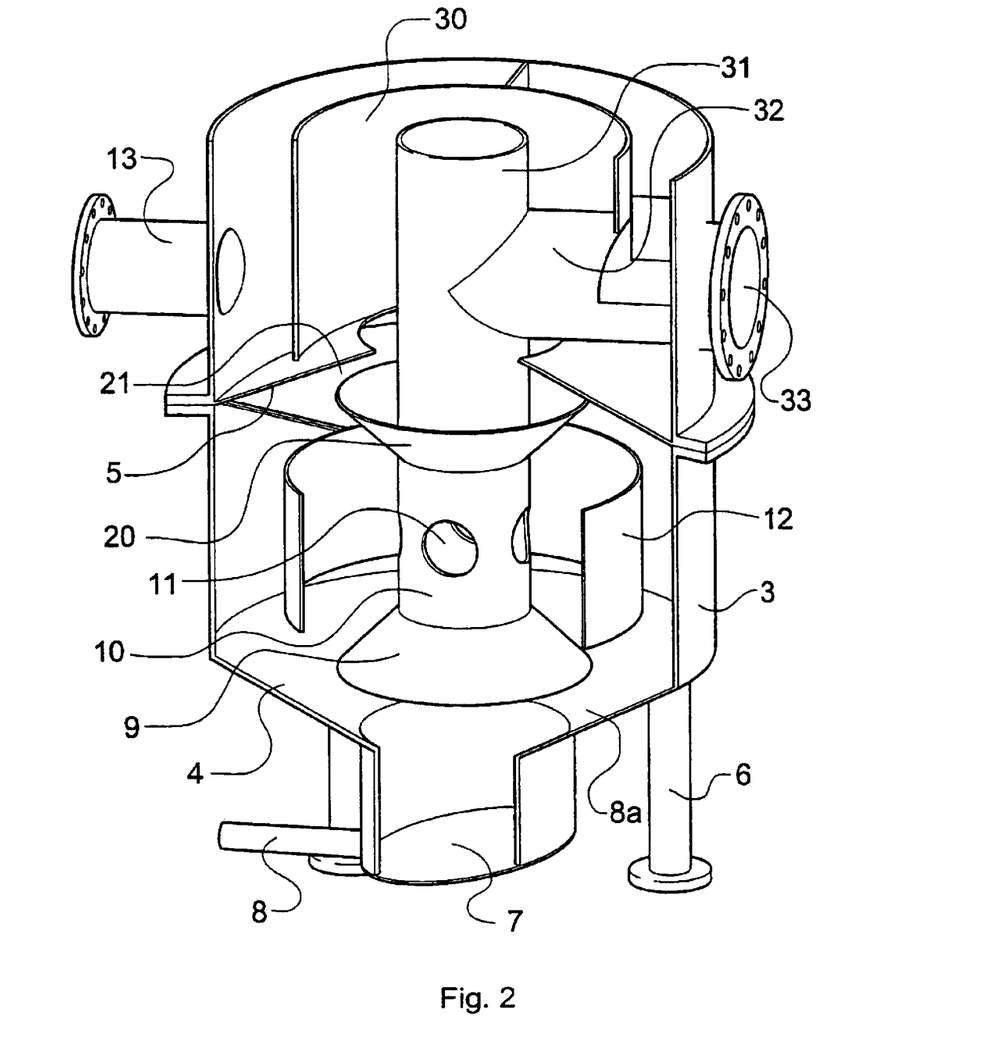
Figure 3:
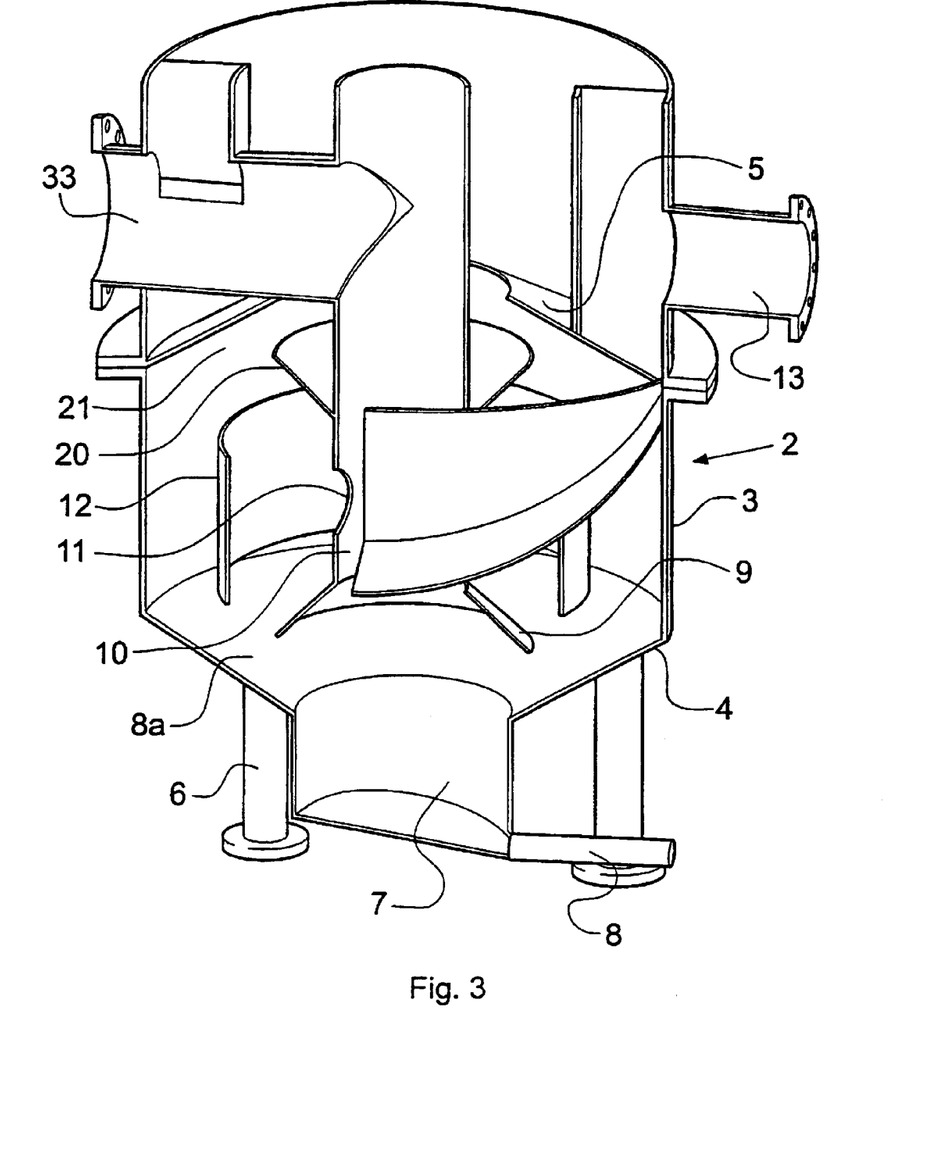

Reference is now made to FIGS. 1–3, which illustrate the same device. The device 1 comprises a vessel 2 defined by a cylindrical outer wall 3, a base 4 and an upper wall or lid 5. The vessel may be supported on legs 6. The base 4 includes a sump 7 into which settled solid matter falls from where it is removed via conduit 8. Situated adjacent the base 4 is a frusto-conical member 9 which defines, with the base, an annular opening 8a through which solid matter passes on its way to the sump, under the action of various flow patterns (as explained in more detail below) created in use within the vessel 2. The conical member 9 may be either solid or hollow (as shown) and communicates with a tubular member 10 which also acts to support the conical member 9. The tubular member 10 has openings 11 through which liquid may flow during use of the device. In the vessel, approximately halfway between the axis and the outer wall 3 of the embodiment shown, is an annular dip-plate 12 which acts to stabilize flow patterns in the vessel. The dip plate may be supported by connecting rods (not shown) either to the base 4 or the lid 5. The aforementioned conical member 9 adjacent the base 4 and dip-plate 12 are elements of a hydrodynamic separator which, as is known in the art, for example GB-A-2082941, enhance the settlement of settleable matter from a liquid introduced tangentially into the vessel via an inlet, although it should be noted that the particular arrangements of inlet and outlet shown in FIGS. 1–6 are not known in the art.

In accordance with the present invention, the device 1 is also provided with elements for the creation of hydrodynamic flow patterns leading to the enhanced separation of floatable matter from the liquid flow introduced into the vessel via the inlet 13 (described below with reference to FIGS. 4 to 6 in more detail). These elements comprise a conical member 20 which is arranged with its base uppermost, and which is oriented axially about the vessel. This conical member 20 is adjacent the lid 5 of the vessel and defines with the lid an annular opening 21 through which flow carrying floatable matter passes in operation of the device. The conical member 20 is frusto-conical in shape and is attached to tubular member 10, in mirror image fashion to conical member 9 in the lower part of the vessel. The annular dip-plate 12 which is present as one -of the elements of the conventional hydro-dynamic separator is also an element desirable to stabilise the flow patterns in the vessel which are created as a result of the low energy circulating flow in the vessel 2, which cause floatable matter to rise upwardly to the lid and there to be driven towards the opening in the lid.

As shown best in FIG. 2, floatable matter is directed through the annular slot or opening 21 and to chamber 30 from where it may be removed, either continuously or in batchwise fashion. Within chamber 30 is an extension 31 of the tubular member 10 for receiving flow from vessel 2 which has passed upwardly through the tubular member 10. This flow passes into conduit 32 and hence away from the device via port 33.

Figure 4:
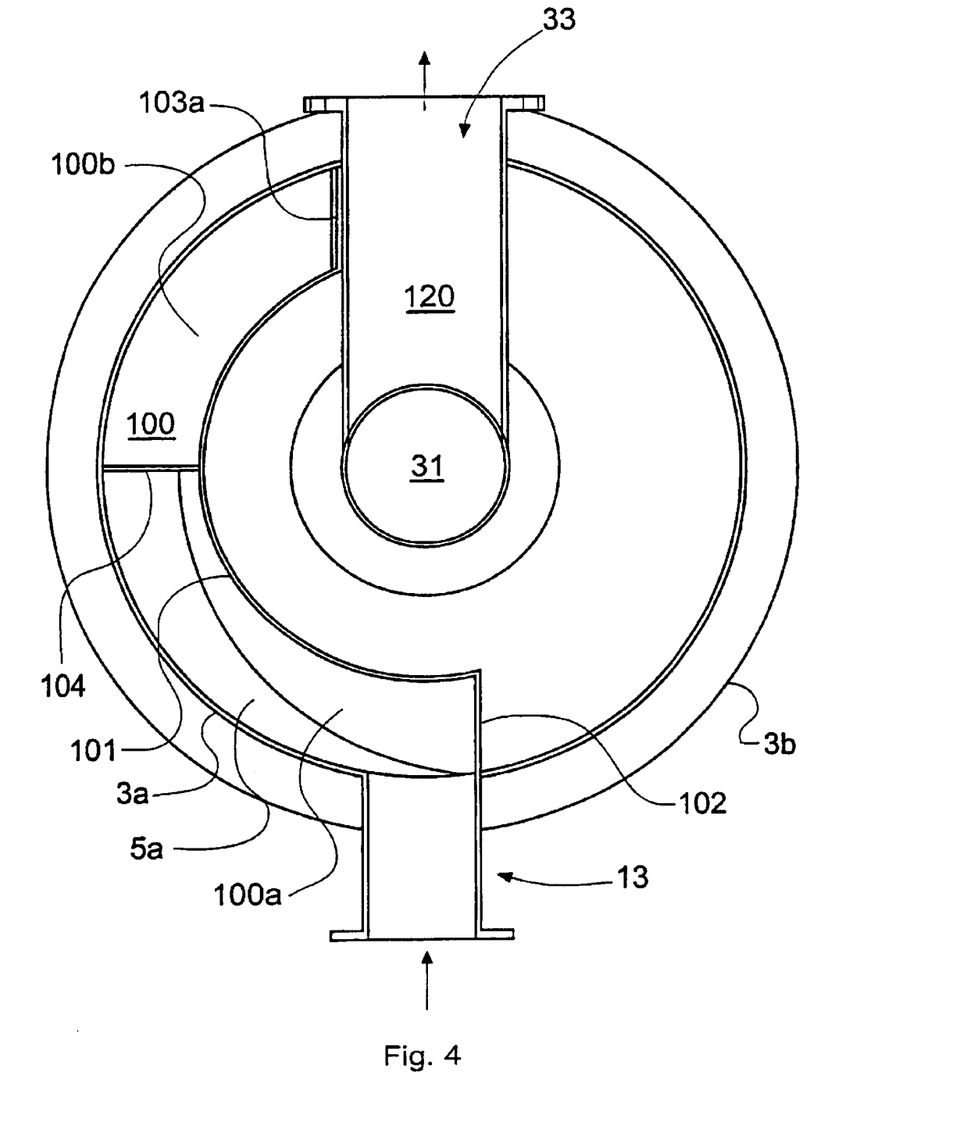
FIG. 4 is a plan view of the separator shown in FIGS. 1 to 3.
Figure 5:
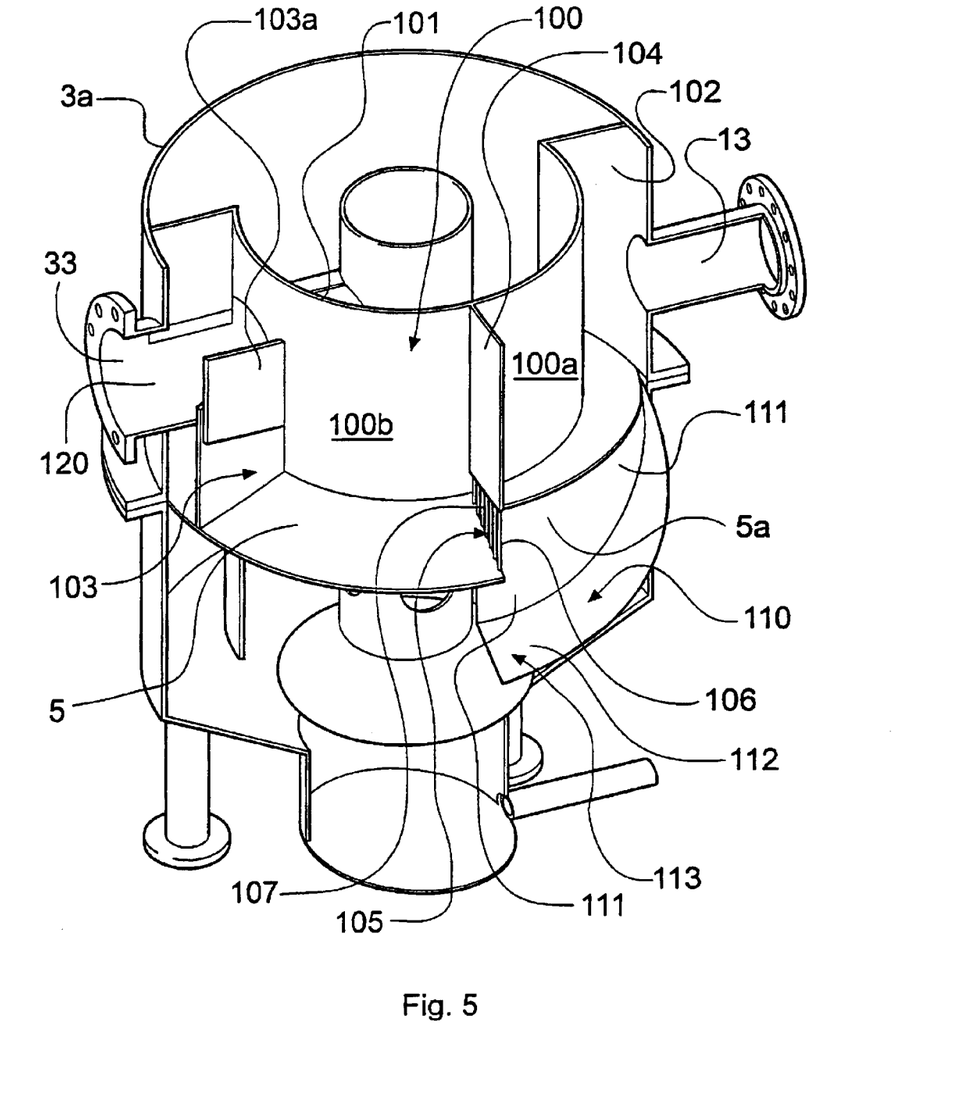
FIGS. 5 and 6 are other perspective cut away view of the separator shown in FIGS. 1 to 3.
Figure 6:
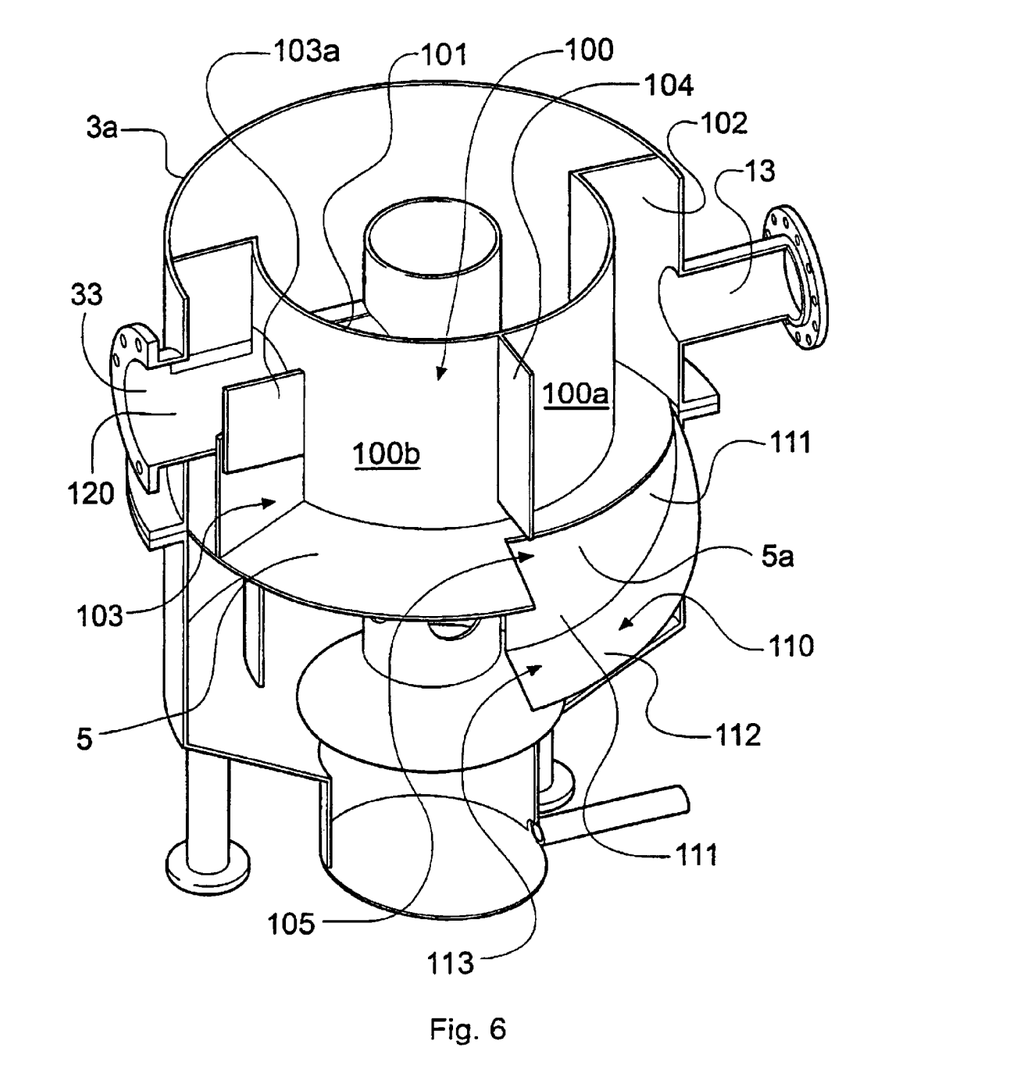

FIGS. 4 to 6 illustrate in detail the arrangement of the elements of the inlet means by which liquid is introduced into the vessel and, under some circumstances, caused to by-pass the vessel. The arrangement is best shown in FIG. 5. The inlet 13 opens into an inlet chamber 100 which is part of an annulus whose outer wall 3a is an extension of the outer wall 3 of the vessel and whose inner wall 101 is a part circular vertical wall, concentric with the outer wall 3a. The chamber is bounded at its lower end by the upper surface of the upper wall 5. At each end of the chamber are vertical walls 102 (at the end adjacent the inlet 33) and 103 (at the end adjacent the outlet 13). A baffle 104 divides the chamber 100 into zones 100a and 100b. Baffle 104 extends between inner wall 101 and outer wall 3a but terminates above the level of the upper wall 5 so leaving a slot 105 between zones 100a and 100b. In the embodiment shown in FIG. 5, the slot 105 is provided with a floatables screen 106 which comprises a series of spaced apart parallel bars 107. Vertical end wall 103 is provided with an adjustable extension 103a. There is no such floatables screen in the embodiment shown in FIG. 6.

A portion 5a of the upper wall or lid is cut out to provide an opening via which liquid in the chamber 100a may flow into the vessel. This cut-out portion communicates with an inlet chute 110 which is bounded by the outer wall 3 (also see FIG. 1), an arcuate inner wall 111 and a sloping base portion 112. Liquid is directed under the pressure head in chamber 100a into the inlet chute 110 and from there is directed in a rotational direction into the vessel via an outlet slot 113. The inlet slot 113 to the vessel is at a height approximately at the midpoint of the vessel.

In operation of the device shown in FIGS. 1 to 6, a liquid flow containing a solid settleable matter, and floatable matter, such as grease, is introduced into vessel 2 through inlet 13 and the inlet duct arrangement shown in FIGS. 5 and 6. As a consequence of the elements in the vessel 2, particularly the conical members 9 and 20 and the dip-plate 12, complex flow patterns are established in the device which cause settleable solid matter to fall to the base under gravitational forces, and there be swept towards the opening 8a and into the sump 7 for removal. Floatable matter, on the other hand, floats upwardly and migrates towards the centre of the device where it passes to chamber 30, from which it is removed intermittently in the embodiment shown. Liquid additionally flowing in a toroidal fashion in the vessel passes through the inlet opening 11 and up through tubular member 10 and there to the extension member 31 and onto conduit 32, from where it is removed via the outlet port 33.

Under normal conditions, incoming liquid to be treated remains in chamber 100, with any floatable material being retained in zone 100a by virtue of the screen 105. Under high flow conditions, liquid may bypass the vessel by overflowing over the top of the weir 103a into a chamber 120 which communicates with outlet 33. The height of the weir 103a may be adjusted depending on the operational conditions of the separator.

The inlet arrangement shown in FIGS. 4 to 6 permits the primary inlet 13 to the separator to be placed at a height which corresponds to the height of the outlet 33. This provides the advantage over prior art arrangements such as the one shown in, for example, FIGS. 7a and 7b. This arrangement is of a known hydrodynamic separator in which settleable matter is separated from a liquid containing it. In such an arrangement, there is a primary inlet 200 which flows into an upstream chamber 201 which has an outlet 202 adjacent its base which introduces the liquid to be treated into the vessel at a height approximately at the mid point of the vessel. It will be noted that primary inlet 200 is at the same height as the outlet 203 from the separator. This is necessary to preserve the desired height of liquid in the system. The arrangement shown in FIGS. 1 to 6, with the inlet arrangement shown allows a separator system to be constructed which does not require the upstream chamber 201 of the system shown in FIGS. 7a and 7b.

Figure 8:
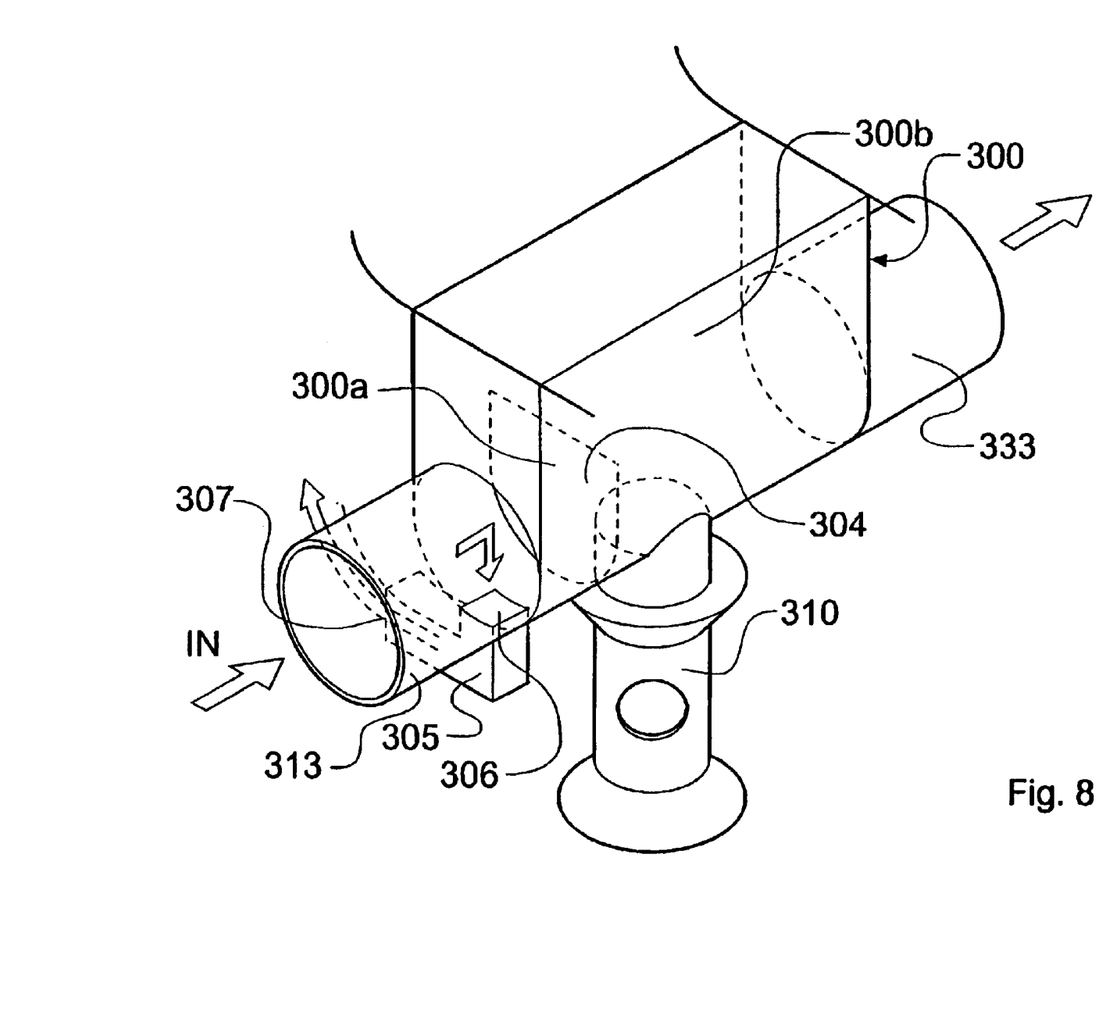
FIGS. 8 and 9 show an alternative arrangement of separation in accordance with the present invention.
Figure 9:
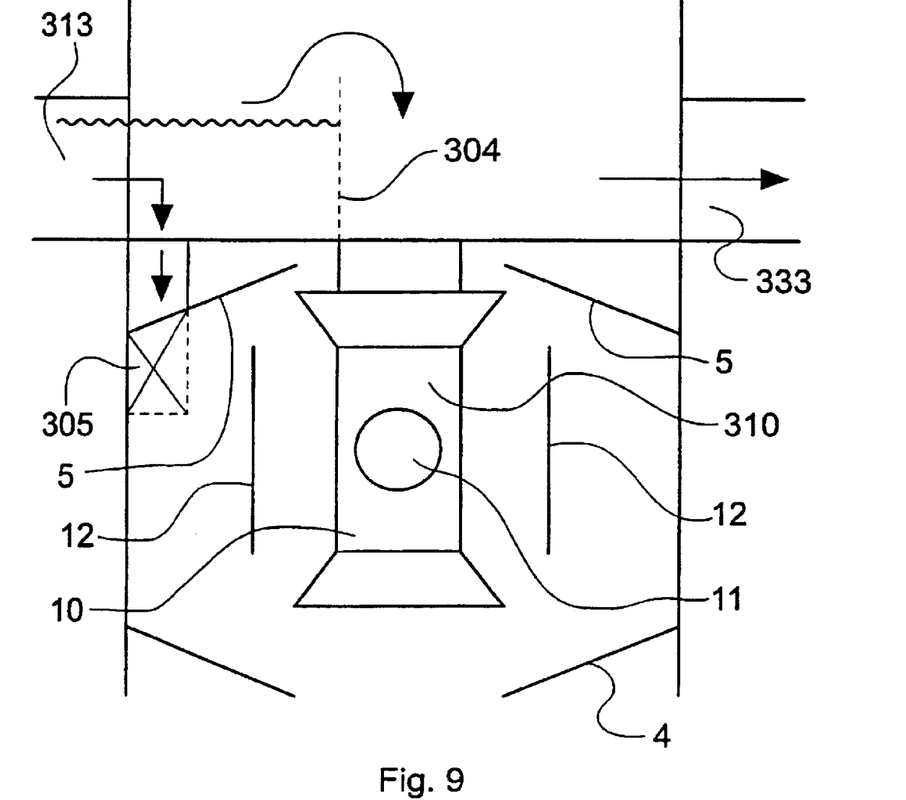

FIGS. 8 and 9 show another embodiment of the present invention having an alternative inlet means and by-pass construction. FIG. 8 is a partial view showing elements of the internal structure of the separator whilst FIG. 9 is a cross-section through the alternative separator. In this embodiment of the invention, the inlet 313 opens into an inlet chamber 300a which is part of a linear passageway 300 (as opposed to arcuate passageway in the embodiment of FIGS. 1 to 7) which extends from the inlet 313 to the outlet 333. Passageway 300 is divided by a barrier 304 into inlet chamber 300a and the outlet chamber 300b. The interior of the vessel (not shown in FIG. 8) communicates via tubular member 310 with outlet chamber 300b whereby liquid in the vessel is passed to outlet 333.

At normal flows, liquid from inlet chamber 300a flows into inlet slat 305 via the opening 306 in the inlet slot 305. The elongate inlet slot 305 extends circumferentially and is bounded by top, bottom and side walls to confine liquid flowing into it and direct said liquid towards its outlet 307 imparting a tangential component to the liquid flow in the vessel.

In this arrangement, at high flows, liquid may overflow barrier 304 and pass directly to outlet 333, thus by-passing the vessel (see FIG. 9).

Figure 10:
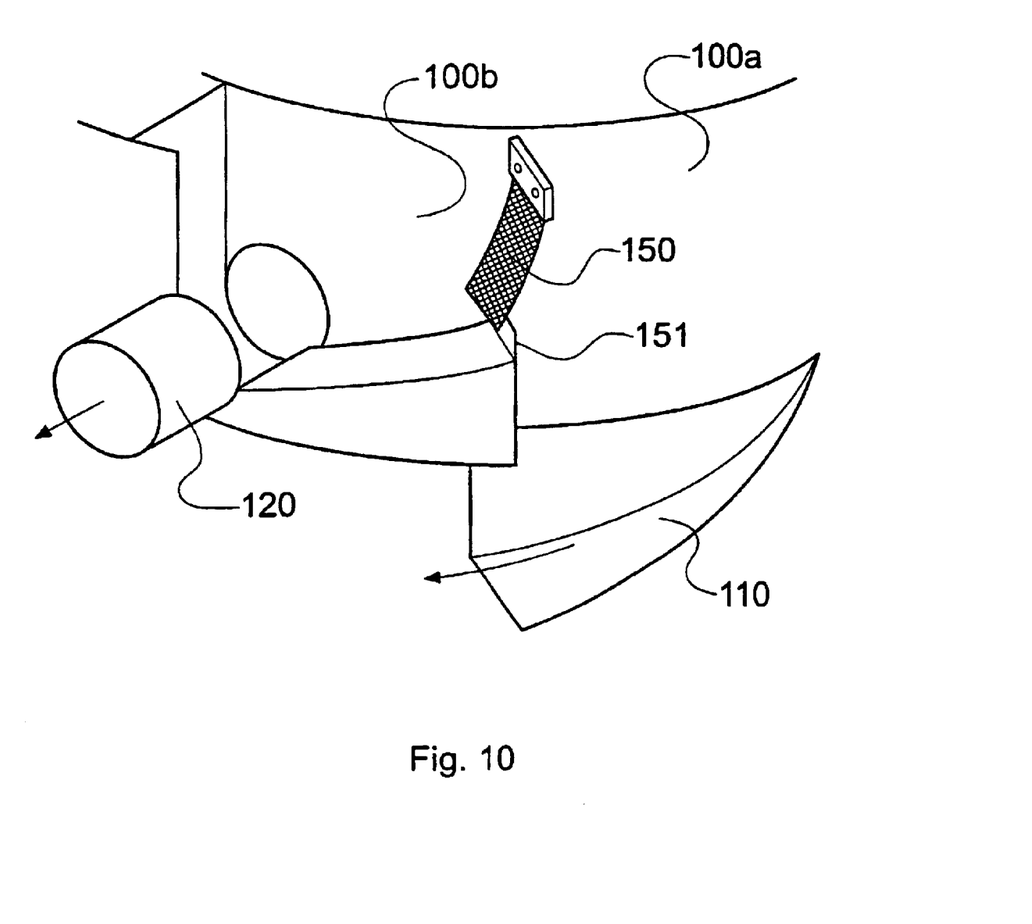
FIG. 10 illustrates an alternative arrangement for controlling by-pass of liquid flow.

FIG. 10 illustrates an alternative to the baffle 104 shown in FIGS. 5 and 6 and described above. In place of baffle 104 is a flexible flap 150 which is secured along an upper edge, with the flap 150 being capable of flexing under a force applied to it. The flap 150 may, for instance, be made of a rubber material. Under normal conditions, the flap 150 is sufficiently resilient to seal against a lip means 151 at the floor of the chamber 100b thus isolating the inlet chamber 102a from the chamber 100b. Under high flow conditions, liquid builds up on the inlet side of the flap 150 until, at a predetermined height (dependent on the resilience of flap 150), the weight of liquid is sufficient to bias the flap 150 open and release flow into chamber 100b and hence to outlet 120. When the liquid level subsides, the flap 150 returns to its normal position in which the opening between the inlet chamber 100a and the chamber 100b.

Figure 11A:
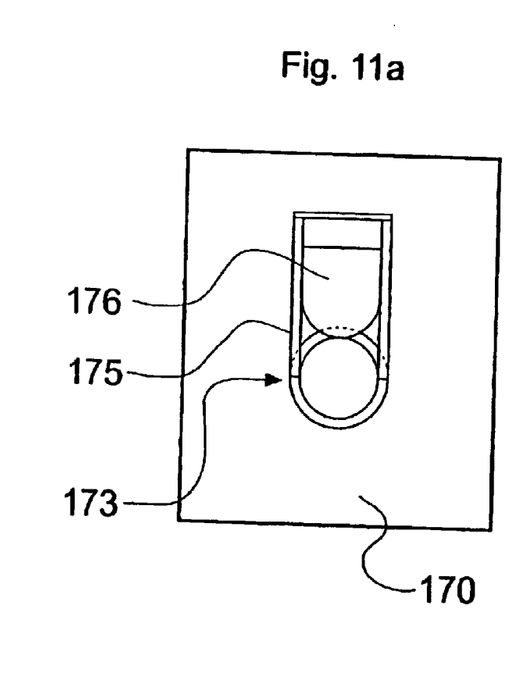
FIGS. 11a, 11b and 11c illustrate another alternative arrangement for controlling by-pass of liquid flow in a separator in accordance with the invention.
Figure 11B:
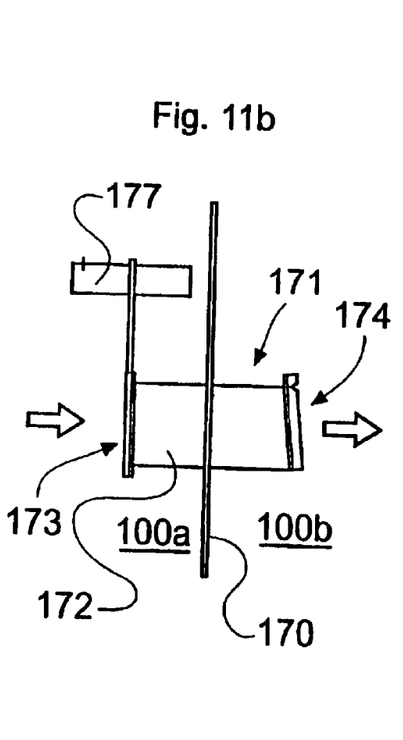
Figure 11C:
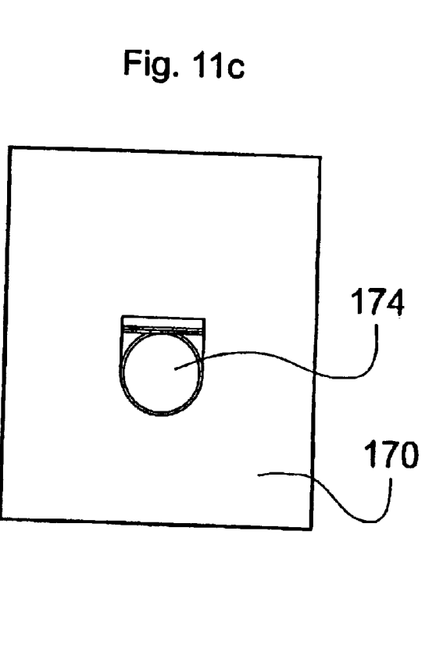

FIGS. 11a, 11b and 11c show another alternative to baffle 104 as shown in FIGS. 5 and 6. FIG. 11a is a front view, FIG. 11b is a side view and FIG. 11c is a rear view of the arrangement. In place of baffle 104, a wall 170 is provided which forms a barrier between chambers 100a and 100b. The barrier 170 includes a by-pass means 171 comprising a tubular spigot 172 which extends through barrier 170 and which is provided with a float-operated closure 173 at the inlet chamber 100a side and a non-return flap 174 on the discharge side. The float operated closure comprises a closure housing 175 in which the closure means 176 may slide in a vertical plane to open and close an opening at the end of the tubular spigot 172. The closure means 176 is attached to a float 177.

In operation, under high flow conditions, liquid builds up in inlet chamber 100a. At a predetermined liquid height above the height of the tubular spigot 172, the liquid in chamber 100a begins to float the float 177 and, as the height increases, float 177 is lifted upwards to lift the closure member 176 and enable liquid to flow through the tubular spigot 172. Liquid flow to chamber 100b through non-return means 174 is permitted, but flow in the opposite direction is restricted by the non-return means 174. When the liquid level falls, the float moves downwardly and closure 176 closes access to the spigot 172. As mentioned previously, the height of the float 177 may be chosen such that liquid flow through tubular spigot 172 is only permitted when the height of liquid in chamber 100a is above the top of the tubular spigot 172. This ensures that floatable matter does not pass to the outlet side 100b via spigot 172.

The separator of the present invention is particularly suited to the treatment of liquid flows containing solid matter such as grit and floatable matter such as grease.

What is claimed is:

1. A hydrodynamic separator for the treatment of a liquid flow containing floatable material to separate the floatable material from the liquid containing it, said separator comprising a separating vessel having:
    a cylindrical outer wall;
    an inlet means for introducing liquid into the vessel in a manner to promote a low energy rotational flow of liquid in the vessel;
    a base at one end of the outer wall;
    an upper wall disposed opposite the base, said upper wall including an axial outlet opening for receiving a flow containing floatable material separated from the liquid flow to the vessel;
    a flow modifying member provided within the vessel to define with the upper wall an annular opening which is spaced from the outer wall;
    an annular dip plate spaced from the outer wall of the vessel, said dip plate comprising an upper edge spaced from the upper wall to define a gap for the flow of liquid containing floatable matter; and
    an outlet means, separate from the axial outlet opening in the upper wall, comprising a conduit for removing a primary liquid flow from the vessel, which conduit communicates with the interior of the vessel at a substantially axial location between the base and the upper wall.

2. A separator according to claim 1, wherein the upper wall slopes upwardly towards the annular opening.

3. A separator according to claim 1, wherein the inlet means comprises, within the vessel and communicating with an inlet opening in the outer wall of the vessel, a duct arranged to direct incoming liquid flow in an arcuate path adjacent the inner surface of the outer wall of the vessel thereby to create a rotational flow of liquid and suspended solid matter in the vessel.

4. A separator according to claim 3, wherein the duct comprises a vertical wall inward of the outer wall of the vessel, extending part way round the vessel, and a base wall forming a lower barrier to the duct.

5. A separator according to claim 4, wherein said vertical wall is parallel or generally parallel to the outer wall of the vessel.

6. A separator according to claim 4, wherein said vertical wall intersects the outer wall at one end and, as a result of having a smaller radius of curvature than the outer wall, follows a path which diverges from the outer wall.

7. A separator according to claim 3, wherein the base wall slopes downwardly in a direction away from the inlet opening.

8. A separator according to claim 3, wherein the inlet opening into the vessel is provided in the outer wall at a position above the upper wall, communicating with an inlet chamber which lies above the inlet duct and which communicates with the duct via a slot in the upper wall of the vessel.

9. A separator according to claim 8, wherein the inlet chamber extends towards an outlet of the outlet means, beyond a point at which the inlet duct opens into the vessel.

10. A separator according to claim 9, wherein a baffle is provided to divide the inlet chamber into two portions, the baffle terminating above the floor of the inlet chamber to define a slot whereby liquid may flow between the two portions of the inlet chamber.

11. A separator according to claim 10, wherein the slot is provided with a screen.

12. A separator according to claim 11, wherein the screen comprises a series of spaced apart vertical bars.

13. A separator according to claim 10, wherein a weir having an adjustable height is provided at the outlet side of the inlet chamber, so that an overflow portion of the flow to the inlet chamber may flow to the outlet.

14. A method of separating floatable matter from a liquid flow containing the floatable mater, said method comprising the steps of:
    introducing the liquid flow into a separator as claimed in claim 1 via its inlet means and causing the liquid to flow in a rotational manner within the vessel whereby the floatable matter is directed towards and through the outlet opening in the upper wall of the separator.

15. A hydrodynamic separator for the treatment of a liquid flow containing settleable matter from the liquid containing it, said separator comprising a vessel having:
    a cylindrical outer wall;
    a base at one end of the outer wall, wherein the base includes an axial cutlet opening for receiving a flow containing settleable matter separated from the primary liquid flow;
    an upper wall disposed opposite the base; and
    an inlet means for introducing the liquid into the vessel in a manner to promote a rotational flow of liquid in the vessel, the inlet means comprising an inlet chamber disposed above the upper wall for receiving the liquid flow, the inlet chamber having a floor Provided with an aperture, and a duct disposed below and communication with the inlet chamber through the aperture, the duct having an outlet oriented so that liquid entering the vessel through the duct promotes a rotational flow of liquid within the vessel.

16. A separator according to claim 15, wherein the duct comprises a vertical wall inward of the outer wall of the vessel, extending part way round the vessel, and a base wall forming a lower barrier to said duct.

17. A separator according to claim 16, wherein said vertical wall is parallel or generally parallel to the outer wall of the vessel.

18. A separator according to claim 16, wherein said vertical wall intersects the outer wall at one end and, as a result of having a smaller radius of curvature than the outer wall, follows a path which diverges from the outer wall.

19. A separator according to claim 16, wherein the base wall of the duct slopes downwardly in a direction away from the inlet opening.

20. A separator according to claim 15, further comprising an outlet means, separate from the axial outlet opening in the upper wall, comprising a conduit for removing a primary liquid flow from the vessel, which conduit communicates with the interior of the vessel at a substantially axial location between the base and the upper wall, wherein the inlet chamber extends towards an outlet of the outlet means, beyond a point at which the duct opens into the vessel.

* * * * *